US012638030B2

(12) United States Patent
Morgan et al.

(10) Patent No.: US 12,638,030 B2
(45) Date of Patent: May 26, 2026

(54) I-BEAM CLAMP

(71) Applicant: Trailer Aerodynamics LLC, Chicago, IL (US)

(72) Inventors: Justin Kane Morgan, Anderson, SC (US); Parker Baxter, Greenville, SC (US); Zachary Alexander Merrill, Greenville, SC (US)

(73) Assignee: Trailer Aerodynamics LLC, Chicago, IL (US)

( * ) Notice: Subject to any disclaimer, the term of this patent is extended or adjusted under 35 U.S.C. 154(b) by 302 days.

(21) Appl. No.: 18/255,938

(22) PCT Filed: Dec. 8, 2020

(86) PCT No.: PCT/US2020/063713
§ 371 (c)(1),
(2) Date: Jun. 5, 2023

(87) PCT Pub. No.: WO2022/125065
PCT Pub. Date: Jun. 16, 2022

(65) Prior Publication Data
US 2024/0044348 A1     Feb. 8, 2024

(51) Int. Cl.
*F16B 2/12* (2006.01)
*F16B 2/06* (2006.01)
(Continued)

(52) U.S. Cl.
CPC ............... *F16B 2/065* (2013.01); *F16B 2/12* (2013.01); *F16B 2/14* (2013.01); *B62D 35/005* (2013.01)

(58) Field of Classification Search
CPC . F16B 2/12; F16B 2/14; B62D 35/001; B62D 35/008; B65D 35/001; B65D 35/008
See application file for complete search history.

(56) References Cited

U.S. PATENT DOCUMENTS

RE17,629 E * 3/1930 Wehr ...................... B65G 9/008
                                                          104/111
3,465,995 A * 9/1969 Whitman .................. F16B 2/12
                                                          248/228.3
(Continued)

FOREIGN PATENT DOCUMENTS

GB          2267532 A     12/1993
KR     20200036189 A     4/2020

OTHER PUBLICATIONS

European Patent Office, International Search Report dated Sep. 3, 2021, pp. 1-13 (included), European Patent Office, Rijswijk, The Netherlands.

*Primary Examiner* — Michael P Ferguson
(74) *Attorney, Agent, or Firm* — Hansen Reynolds LLC

(57) ABSTRACT

An I-beam clamp (10) is provided that has a first clamping member (26) having a first flange engagement surface (28) configured for engagement with a first flange surface of a flange of an I-beam. The first clamping member has a first web engagement surface (30) configured for engagement with a first web surface of a web of the I-beam. A second clamping member (32) is provided and configured for engagement with the first flange surface and a second web surface of the web. The first and second clamping members are configured for movement relative to one another in a direction (28) perpendicular to the first and second web surfaces. A third clamping member (40) is present and has a third flange engagement surface (42) configured for engagement with a second flange surface of the flange. The third clamping member is configured for movement toward the second flange surface of the flange of the I-beam.

12 Claims, 12 Drawing Sheets

(51) Int. Cl.
     *F16B 2/14*          (2006.01)
     *B62D 35/00*          (2006.01)

(56)                    References Cited

U.S. PATENT DOCUMENTS

|  |  |  |  |
|---|---|---|---|
| 8,608,122 B2 * | 12/2013 | Mancina | F16B 2/12 |
|  |  |  | 248/228.2 |
| 9,957,991 B2 | 5/2018 | Mancina et al. |  |
| 10,220,888 B2 * | 3/2019 | Haws | F16B 2/065 |
| 2002/0088196 A1 | 7/2002 | Haddock |  |
| 2017/0066487 A1 * | 3/2017 | Boivin | B62D 35/001 |

* cited by examiner

I-BEAM CLAMP

CROSS-REFERENCE TO RELATED APPLICATIONS

The present application is a 35 U.S.C. § 371 application of PCT/US2020/063713 filed on Dec. 8, 2020 and entitled "I-Beam Clamp" and claims benefit thereto. The entire contents of PCT/US2020/063713 are incorporated by reference herein in their entirety for all purposes.

FIELD OF THE INVENTION

The subject matter of the present invention relates to a clamp configured for clamping onto an I-beam for use in turn having objects connected thereon. More particularly, the present application involves an I-beam clamp with three clamping members that are configured for engaging a web and flange to establish multiple clamping surfaces.

BACKGROUND OF THE INVENTION

A tractor trailer unit includes a tractor that hauls a trailer filled with cargo. It is known to provide tractor trailer units with aerodynamic elements, such as trailer skirts, to improve fuel efficiency. However, trailers are not provided with effective attachment points for the various elements that are desired to be attached thereto. Trailers typically have a series of I-beams that support the cargo area of the trailer from which components could be attached. These I-beams are provided in multiple sizes and shapes and can be narrow in size to provide only minimal clamping surface for the attachment of articles. It may be necessary to attach objects to the edges of the I-beams which is not a good place for attachment. Further, known mechanisms of attachment to I-beams such as metal clamps utilize a large number of fasteners, suffer from corrosion, and may be required to be attached to the edge of the I-beams. Plastic attachment mechanism are known and employ a wedge design that is not self-centering and can only clamp onto no more than three surface of the I-beam. Although mechanisms are known for attaching objects to I-beams, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
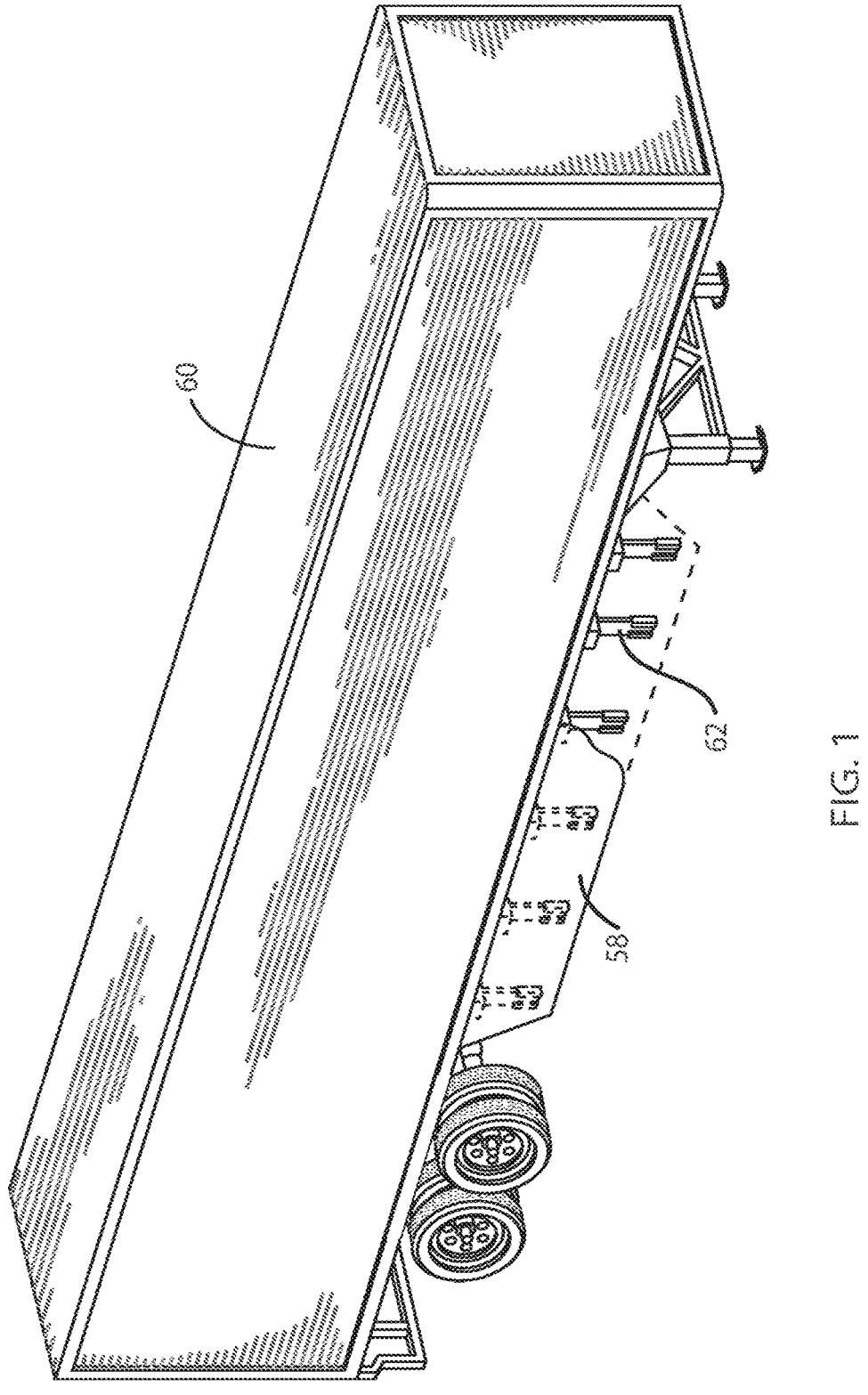
FIG. 1 is a perspective view of a trailer with a trailer skirt.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an I-beam clamp 10 that can be attached to an I-beam 12 so that a component attached to, or integrally formed with, the I-beam clamp 10 can then be in turn attached to the I-beam 12 via the I-beam clamp 10. The I-beam clamp 10 is configured for attachment to the I-beam 12 so that multiple different surfaces and/or component combinations are realized in order to establish a secure and self-centering attachment. The I-beam clamp 10 has a first clamping member 26 with a first flange engagement surface 28 and a first web engagement surface 30 that engage a first flange surface 22 and a first web surface 16 of the I-beam. The I-beam clamp 10 has a second clamping member 32 with a second web engagement surface 36 and a second flange engagement surface 34 that engage a second web surface 18 and a first flange surface 22. Further, the I-beam clamp 10 has a third clamping member 40 with a third flange engagement surface 42 that engages the second flange surface 24 of the I-beam 12.

FIG. 1 shows a trailer 60 of a tractor trailer. A tractor trailer unit includes a tractor (not shown) that attached to the trailer 60 and hauls the trailer 60 and cargo located therein. The tractor trailer unit is sometimes referred to as a semi-trailer truck, a tractor trailer, an eighteen wheeler, a transport truck, or by other names. The trailer 60 includes tires that are all heavy duty truck tires. In this regard, the tires described herein are not designed for nor used with a car, motorcycle, or light truck (payload capacity less than 4,000 pounds) but are instead designed for and used with heavy duty trucks such as 18 wheelers, garbage trucks, or box trucks. The tractor trailer unit can include a single trailer 60 or the tractor trailer unit may have two or three trailers 60 in other embodiments.

Figure 2:
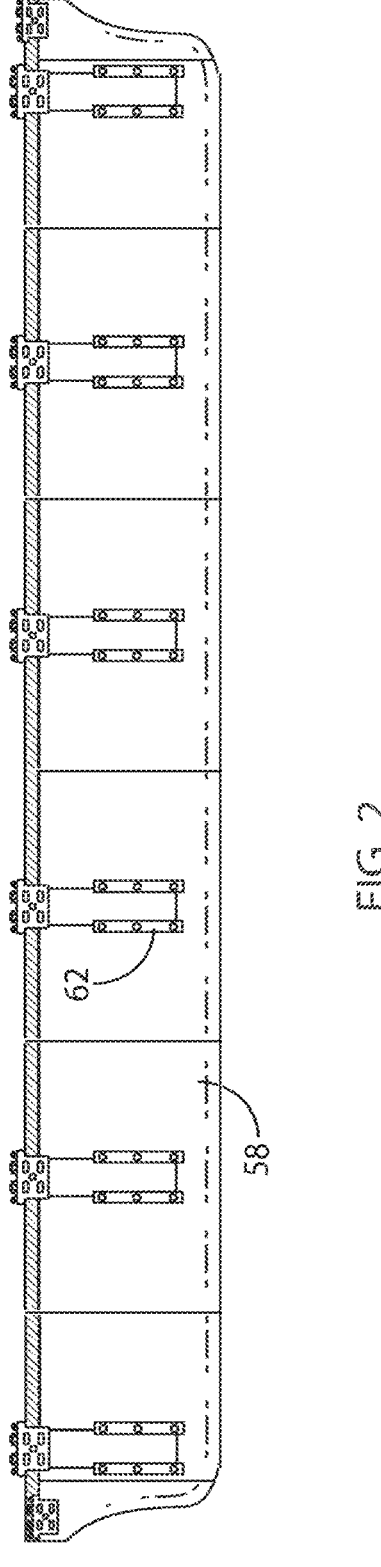
FIG. 2 is a side view of a trailer skirt.

In order to save on fuel costs, it is known to provide trailers 60 with various aerodynamic elements to increase the aerodynamic performance when traveling. Wake disrupter, fairings, and trailer skirts are some examples. In FIG. 1, a trailer skirt 58 is shown extending between the tires of the trailer 60 and the attachment area of the trailer 60 with the tractor. The skirt 58 can be a panel or series of panels that deflect air or prevent air from moving under the trailer 60. FIG. 2 is a side view of the skirt 58 that shows a series of support members 62 located along the length of the skirt 58.

The support members 62 have a bracket attached to a panel of the skirt 58 and have bendable members disposed through that bracket, and have a top section rigidly attached to the trailer 60. If the skirt 58 bends by hitting an object on the road, the bendable member likewise bends and slides within the bracket. The support member 62 itself does not hold the skirt 58 but will function to push the skirt 58 back into a normal, at rest position should the skirt 58 be deflected. Although not shown in FIG. 2, brackets attached to the trailer 60 and to the skirt 58 at the very top of the skirt 58 function to hold the skirt 58 to the trailer 60. Should all the support members 62 be removed, the skirt 58 will not fall to the ground but instead the brackets will hold the skirt 58 in the same position. Other mechanisms of holding the skirt 58 and pushing the skirt 58 back into place are known, such as the provision of resilient struts put at an angle to the skirt 58 that hold forces in compression and that function to both push the skirt 58 back into place and hold the skirt 58 off the ground.

Figure 3:
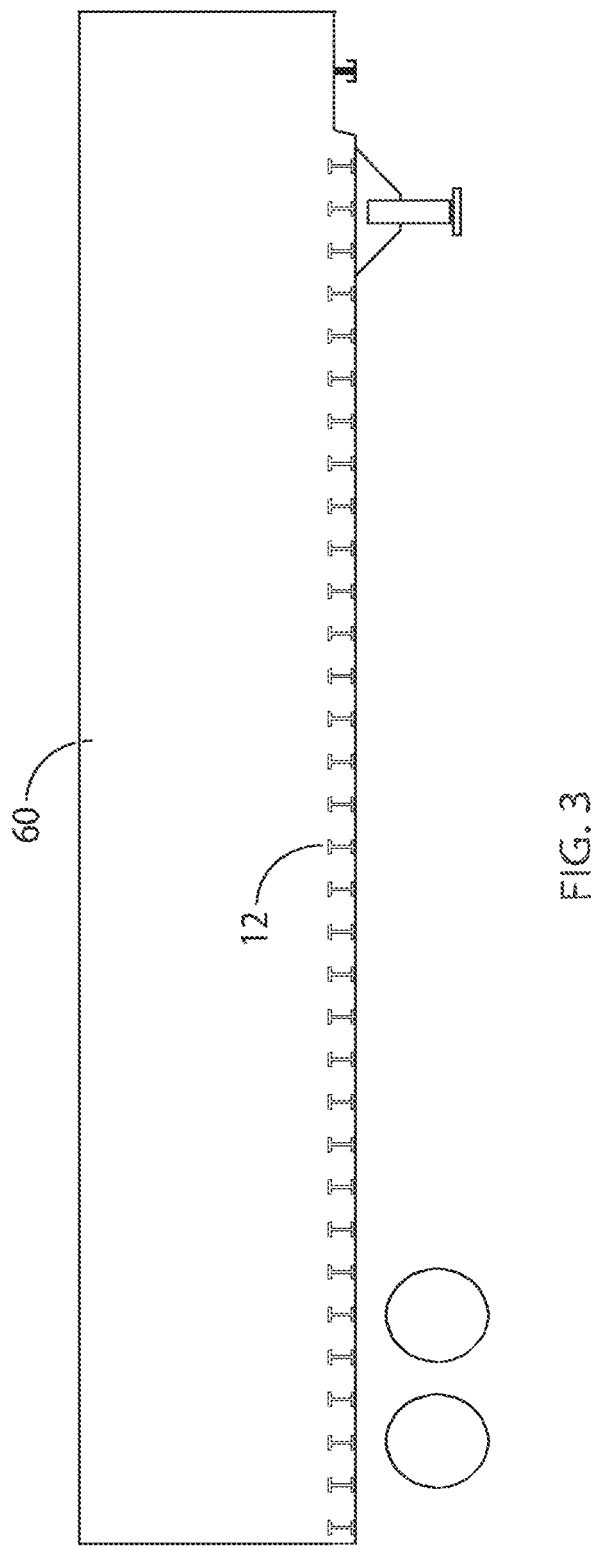
FIG. 3 is a side view of a trailer showing I-beams of the trailer.

FIG. 3 is a side view of a trailer 60 that has a plurality of I-beams 12 that function to support the bottom cargo area of the trailer 60. The I-beams 12 can be exposed to the ground and thus afford an attachment location for objects. The I-beams 12 are oriented so that they extend along the width direction of the trailer 60 as opposed to the length direction. Any number of I-beams 12 can be present, and they can be evenly or unevenly spaced along the length of the trailer 60. A skirt 58 is not shown in FIG. 3. The I-beam clamp 10 can be attached to the I-beams 12 shown in FIG. 3 and objects such as skirts 58 or support members 62 can be attached to the I-beam clamp 10 so that they are in turn attached to the I-beam 12.

Figure 4:
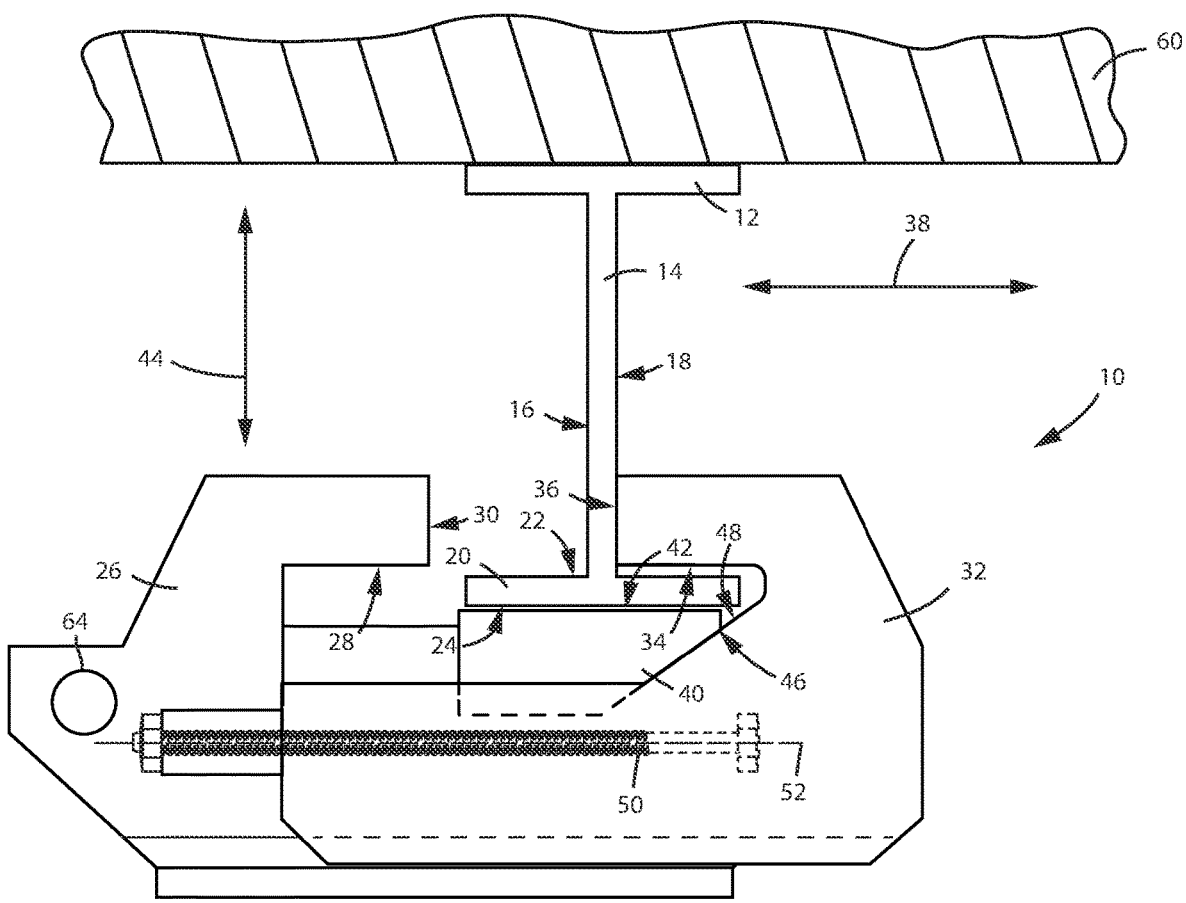
FIG. 4 is a side view of an I-beam clamp with the first and second clamping members oriented away from one another.

One example of the I-beam clamp 10 is shown with reference to FIG. 4 as used in connection with an I-beam 12. The I-beam 12 has a web 14 with a pair of flanges on opposite ends. The flange 20 is identified in FIG. 4, but the other flange is not numbered. The present I-beam clamp 10 can engage one of the flanges 20 of the I-beam 12 but make no contact with the other flange. As shown, the flange 20 that is engaged is the bottom flange 20 of the I-beam 12 but could be the top flange in other embodiments. The web 14 has a first web surface 16 and an oppositely disposed second web surface 18. Direction 38 is perpendicular to the first web surface 16 and to second web surface 18. In other words, direction 38 is parallel to a surface normal of the first and second web surfaces 16, 18. In some embodiments, the direction 38 is the horizontal direction. The flange 20 has a first flange surface 22 that is engaged at its middle by the web 14. The web 14 thus splits the first flange surface 22 up into two separate halves. A second flange surface 24 is oppositely disposed from the first flange surface 22. The web 14 does not engage the second flange surface 24. A direction 44 is perpendicular both the first flange surface 22 and the second flange surface 24. The direction 44 can also be described as being parallel to the surface normal of the first flange surface 22 and the second flange surface 24. The direction 44 is perpendicular to the direction 38, and in the embodiment shown the direction 44 is the vertical direction.

The I-beam clamp 10 has at least three members 26, 32, 40 and they can all be made of metal, plastic, composite materials, or combinations of any of these materials. Although three members 26, 32, 40 are present additional members can be included in the I-beam clamp 10, or there can be no more than these three members 26, 32, 40 in some embodiments. Each one of the three members 26, 32, 40 engage the I-beam 12 and together function to secure the I-beam clamp 10 to the I-beam 12. The first clamping member 26 and the second clamping member 32 can move relative to one another in the direction 38. The first and second clamping members 26, 38 are shown in FIG. 4 as being positioned away from one another their maximum amount so that the first web engagement surface 30 of the first clamping member 26 is positioned as far away from the second web engagement surface 36 as possible. With this positioning, the I-beam clamp 10 can be positioned relative to the I-beam 12 so that the flange 20 can be disposed within the I-beam clamp 10. The flange 20 may have a length in direction 38 longer than that of the distance between surfaces 30 and 36 in the direction 38 so that the I-beam clamp 10 will have to be angled a bit then swung around the flange 20 to position the flange 20 within the open space of the I-beam clamp 10. In order to move the first and second clamping members 26, 32 relative to one another, a first fastener 50 is provided that has an axis 52. Axis 52 extends through the center of the first fastener 50 and is parallel to the direction 38 and is perpendicular to the direction 44. The first fastener 50 has external threading that engages complimentary internal threading of the second clamping member 32. The first fastener 50 also engages the first clamping member 26 but not through a threaded connection. The first fastener 50 has a bolted end that is locked into the first clamping member 26, and the first fastener 50 does not move relative to the first clamping member 26 in direction 38. Turning of the first fastener 50 causes the second clamping member 32 to move along the first fastener 50 and thus likewise move along the first clamping member 26 in the direction 38. Although a first fastener 50 is shown as effecting movement of the clamping members 26, 32 relative to one another, other mechanisms could be used such as linear actuators or gears, or the clamping members 26, 32 could be manually moved relative to one another in other embodiments.

Figure 5:
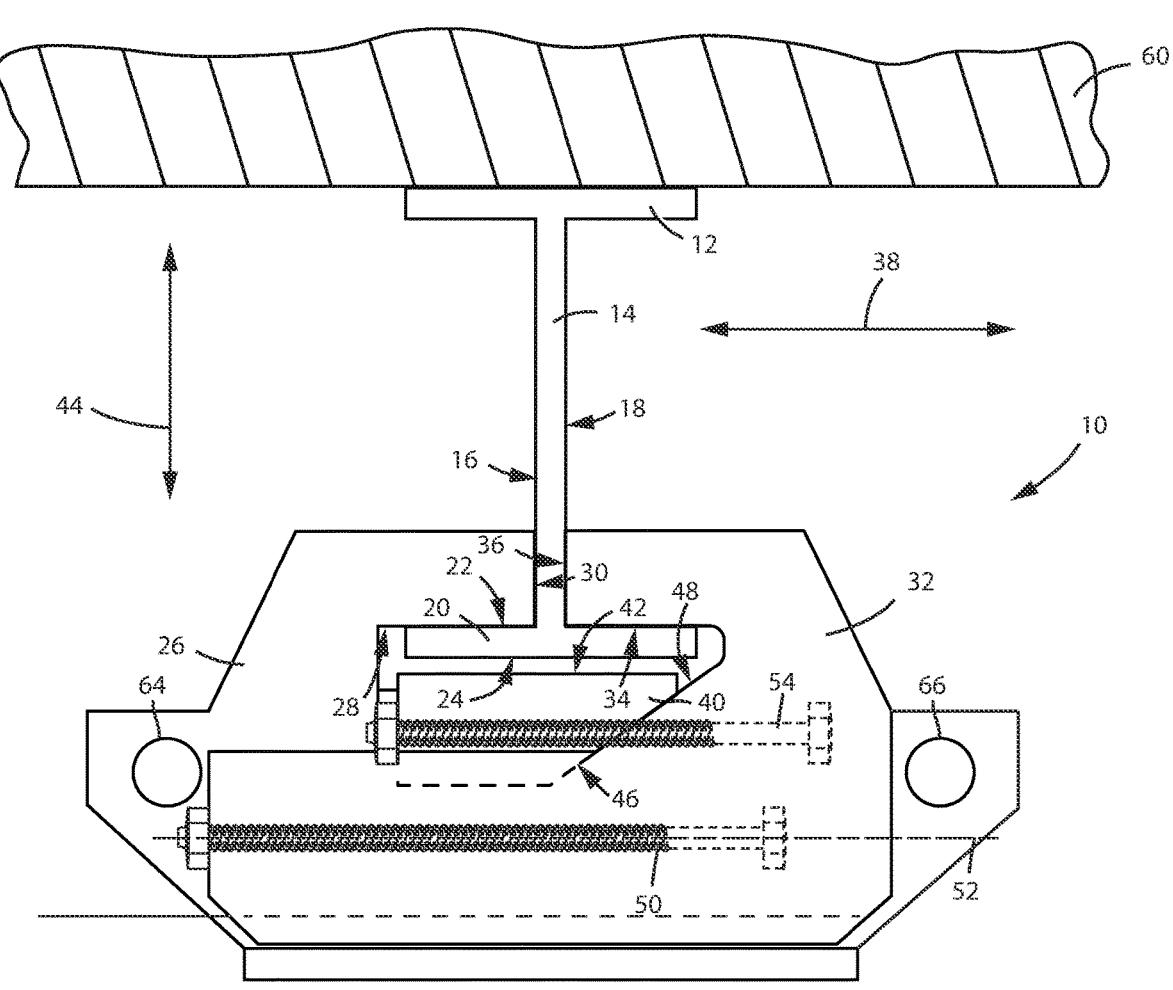
FIG. 5 is a side view of the I-beam clamp of FIG. 4 with the first and second clamping members oriented into a clamping position.

FIG. 5 shows the I-beam clamp 10 of FIG. 4 with the first clamping member 26 actuated so that the surfaces 30, 36 are moved as close together in the direction 38 as is possible considering the presence of the I-beam 12. The first clamping member 26 is provided with a mounting hole 64 and a mounting hole 66 that can be used to attach a skirt 58 or other component to the first clamping member 26. Bolts or other fasteners can be used with the mounting holes 64, 66 so that the skirt 58 or other object can then in turn be attached to and held onto the I-beam clamp 10. The first clamping member 26 has a first flange engagement surface 28 and a first web engagement surface 30 that are perpendicular to one another, wherein the first flange engagement surface 28 is perpendicular to direction 44 and the first web engagement surface 30 is perpendicular to direction 38.

The second clamping member 32 has a second flange engagement surface 34 that is perpendicular to direction 44 and is also perpendicular to a second web engagement surface 36 that is itself perpendicular to direction 38. When the first and second clamping members 26 and 32 are moved relative to one another to engage the I-beam 12, the first web engagement surface 30 engages the first web surface 16, and the second web engagement surface 36 engages the second web surface 18. Additionally, the first flange engagement surface 28 engages the first flange surface 22, and the second flange engagement surface 34 engages the first flange surface 22. The aforementioned four surface engagements are surface upon surface contact so that some area of each is established as opposed to line contact or point contact. In some instances, the four aforementioned surface engagements each are 1 square inch, each 2 square inches, each 3 square inches, greater than 1 square inch, greater than 2 square inches, or from 2 to 12 square inches of surface engagement. The four points of surface contact function to center the I-beam clamp 10 onto the I-beam 12. Tightening of the first fastener 50 will effect a secure attachment of the previously identified four areas of surface contact. The first and second web engagement surfaces 30 and 36 do not extend the entire height of the web 14 in direction 44. In some arrangements, the first and second web engagement surfaces 30 and 36 extend 50% or less than the height of the web 14 in direction 44. The first and second flange engagement surfaces 28 and 34 extend along the entire area of the first flange surface 22 so that the entire first flange surface 22 is covered and engaged by the combination of surfaces 28 and 34.

The I-beam clamp 10 also includes a third clamping member 40 which is visible in FIG. 5. However, the third clamping member 40 does not engage the I-beam 12 as shown in FIG. 5 but is instead spaced therefrom and not in engagement even though the first and second clamping members 26 and 32 are both secured to and in engagement with the I-beam 12. Actuation of the first fastener 50 does not cause the third clamping member 40 to move. A second fastener 54 that has an axis parallel to the axis 52 and extends in the direction 38. The second fastener 54 engages both the second clamping member 32 and the third clamping member 40. The second fastener 54 is free from engagement with the first clamping member 26 and does not engage the first clamping member 26. A third flange engagement surface 42 is located at the top of the third clamping member 40 and directly faces the second flange surface 24. Actuation of the second fastener 54 causes the third clamping member 40 to move relative to the second clamping member 32, and consequently move relative to the first clamping member 26. The second clamping member 32 has a second clamping member inclined surface 38, and the third clamping member 40 has a third clamping member inclined surface 46 that engage one another. The inclination of surfaces 46 and 48 causes the third clamping member 40 to move in both directions 38 and 44 so that the third flange engagement surface 42 will come into contact with the second flange surface 24. In the figures, the fasteners, such as the second fastener 54, are not shown with hidden lines for sake of clarity. However, it is to be understood that the fasteners 50 and 54 could be behind other components either completely or partially as shown in the figures.

Figure 6:
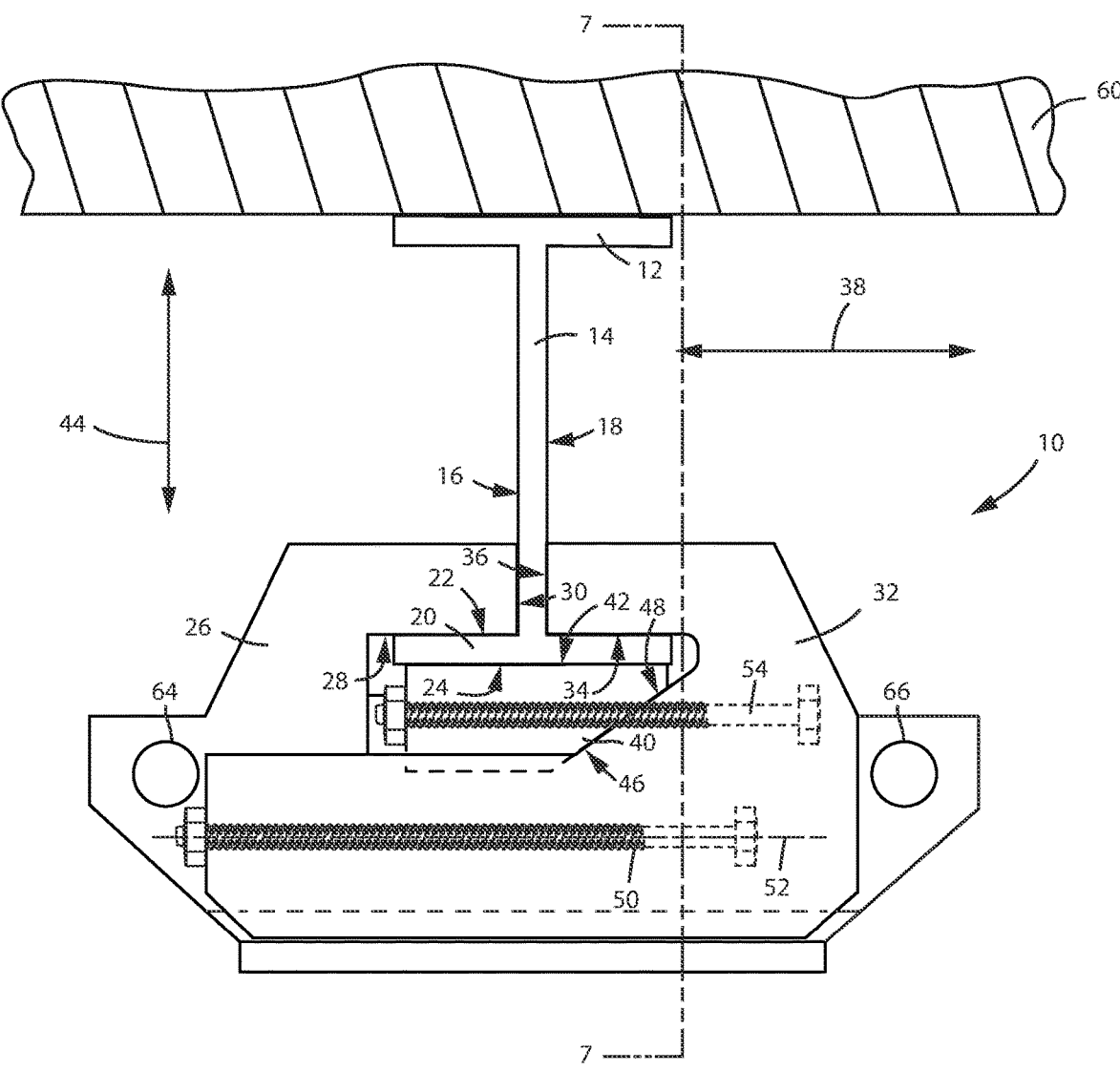
FIG. 6 is a side view of the I-beam clamp of FIG. 5 with the third clamping member engaging the I-beam in a clamping position.

FIG. 6 is the same as FIG. 5 but with actuation of the second fastener 54 so that the third clamping member 40 moves into engagement with the I-beam 12 so that the third flange engagement surface 42 engages the second flange surface 24. The third flange engagement surface 42 may cover and engage the entire second flange surface 24 or may engage and cover less than the entire second flange surface 24. With this engagement, the I-beam 12 is now engaged via five different surface engagements and the I-beam clamp 10 is securely fastened to the I-beam 12. Actuation of the second fastener 54 does not change relative positioning of the first clamping member 26 to the second clamping member 32.

Figure 7:
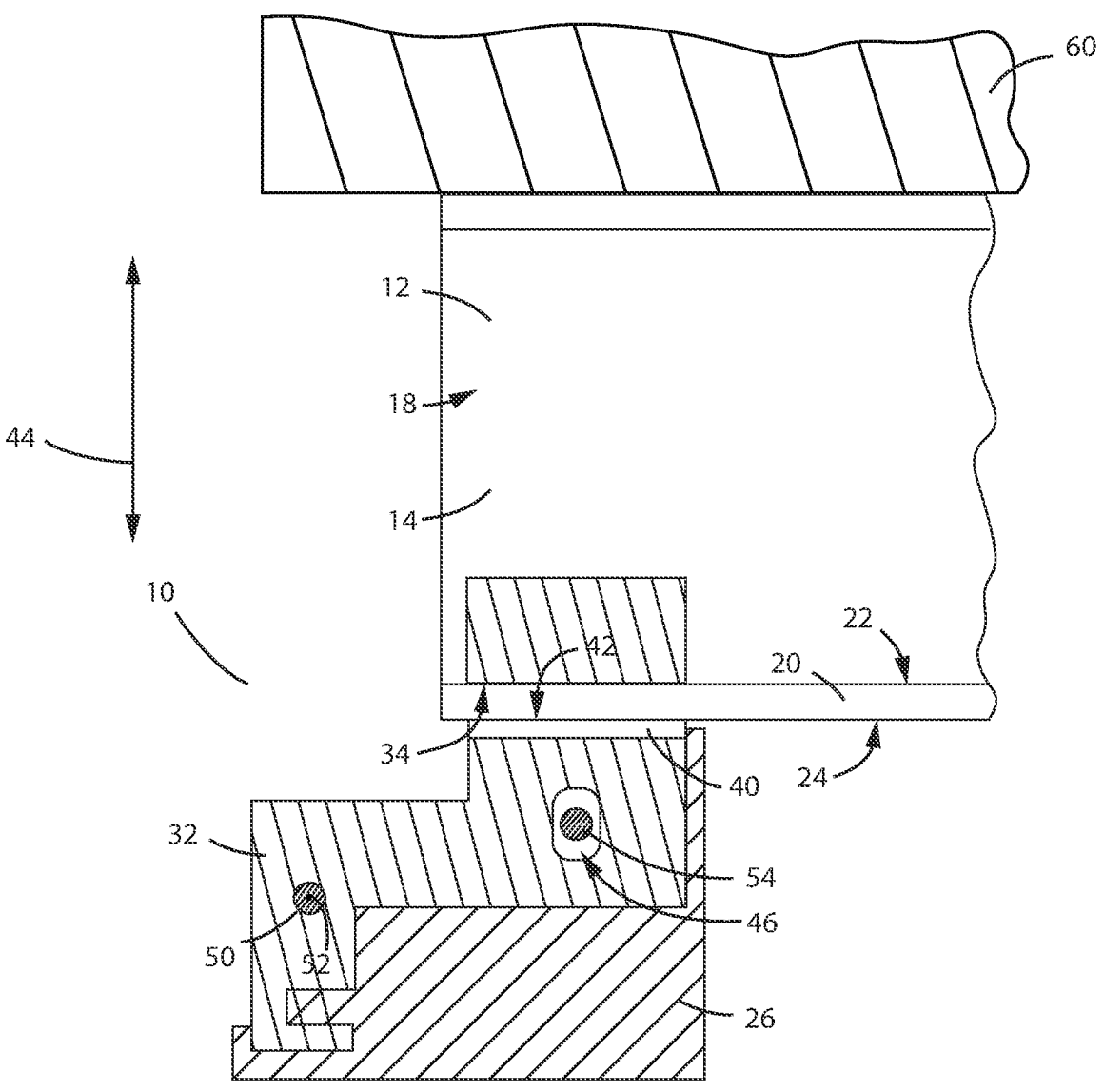
FIG. 7 is a cross-sectional view taken along line 7-7 of FIG. 6

FIG. 7 is a cross-sectional view taken along line 7-7 of FIG. 6 and shows the second clamping member 32 extend along a portion of the length of the I-beam 12. The second clamping member 32 may be at the terminal end of the I-beam 12 or could be spaced inboard some amount from the terminal end of the I-beam 12. The first and second clamping members 26 and 32 are configured so that they have space therebetween to accommodate the positioning of the third clamping member 40 between the members 26 and 32. The second clamping member 32 has a slot through which the second fastener 54 extends and which allows the second fastener 54 to move in the direction 44. The lower left portion of FIG. 7 shows a projection and slot engagement between the first and second clamping members 26 and 32 that allows them to slide together. Projections and slots or any other sliding connection can be used to help lock the first and second clamping members 26 and 32 to one another and to allow them to slide relative to one another. The first and second clamping members 26 and 32 can be permanently attached to one another in sliding engagement, or they may be removably attached to one another.

Figure 8:
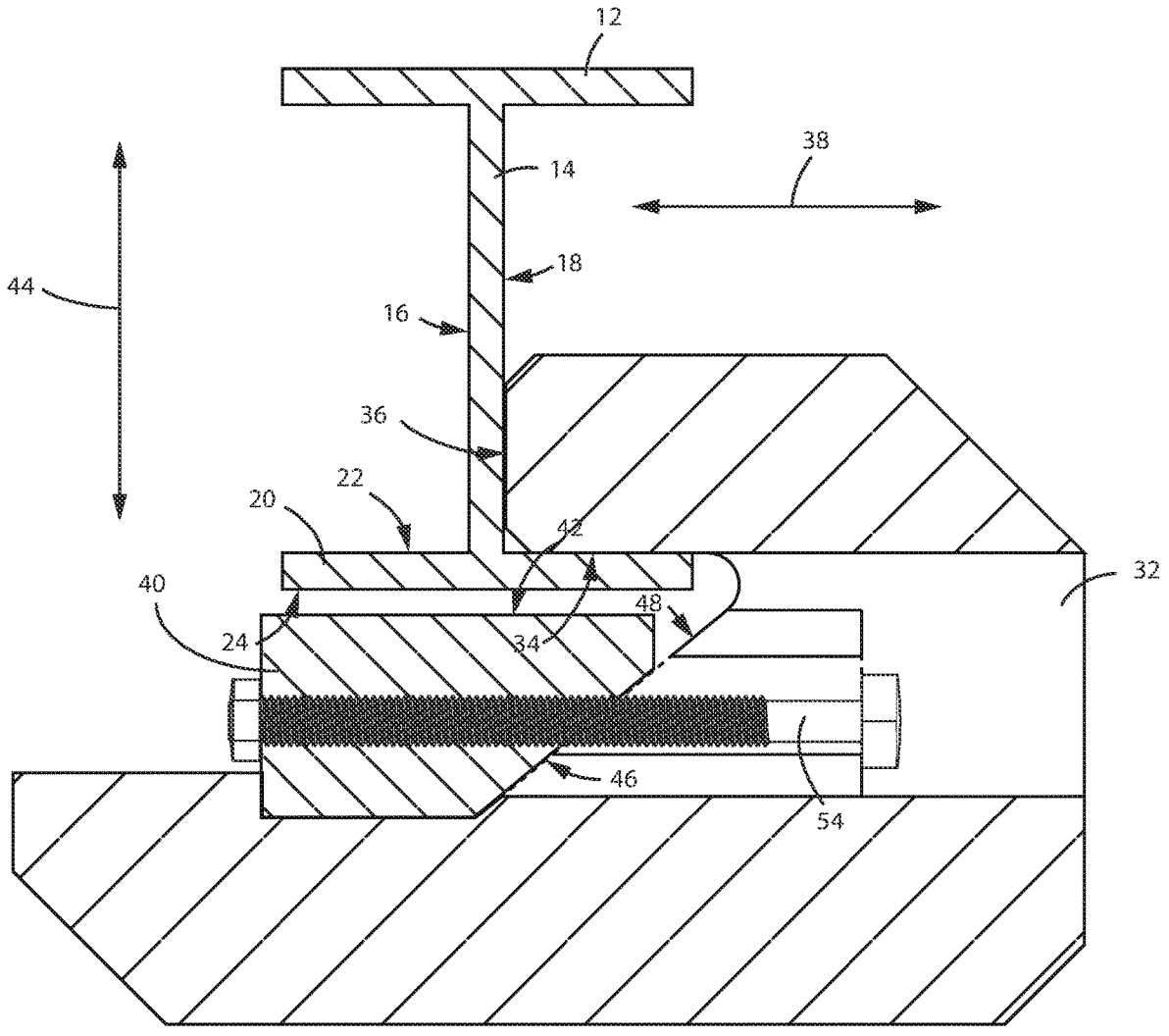
FIG. 8 is a cross-sectional side view of the I-beam clamp with the first member removed for clarity.
Figure 9:
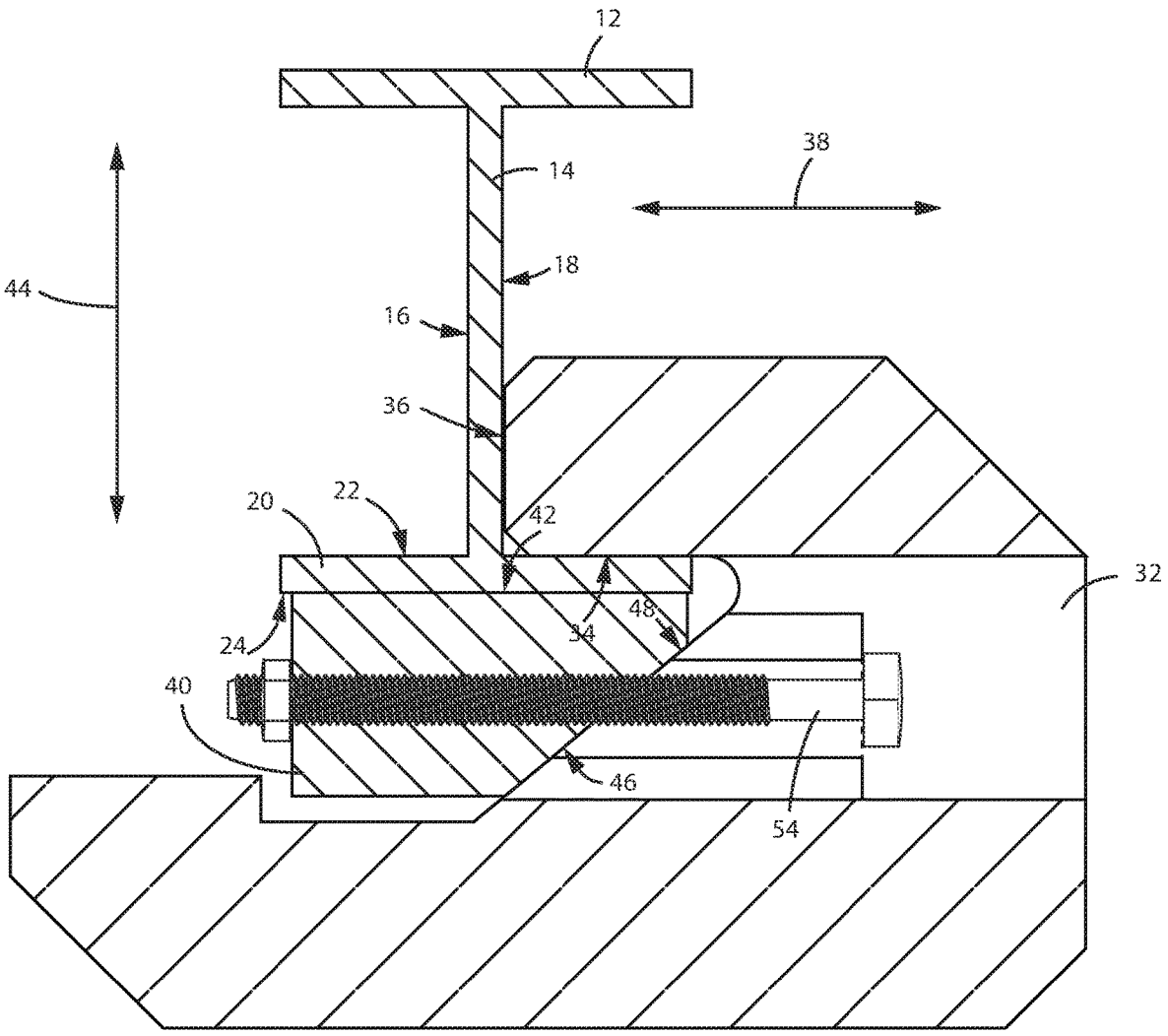
FIG. 9 is a cross-sectional side view of the I-beam clamp of FIG. 8 with the third member engaging the I-beam.

FIGS. 8 and 9 show the I-beam clamp 10 with the first clamping member 26 removed for clarity. The second clamping member 32 has a second clamping member inclined surface 48 that extends so as to have components of extension in both directions 38 and 44. The third clamping member inclined surface 46 likewise has components of extension in both directions 38 and 44. In FIG. 8, the third clamping member 40 is moved its maximum amount away from the I-beam 12 and does not engage the I-beam 12. The second fastener 54 upon rotation does not move in direction 38 relative to the second clamping member 32. The third clamping member 40 does move relative to the second fastener 54 when the second fastener 54 rotates.

Rotation of the second fastener 54 causes the third clamping member 40 to move along the second clamping member inclined surface 48 and engage the I-beam 12 as shown in FIG. 9. The third flange engagement surface 42 engages the second flange surface 24 to lock the I-beam clamp 10 to the I-beam 12 at the fifth surface engagement location. The head of the second fastener 54 moves in the direction 44 upon actuation and is constrained within a slot of the second clamping member 32. The second fastener 54 thus moves in the direction 44 but does not move in the direction 38. The head of the second fastener 54 engages the second clamping member 32 and is held in in place during the actuation by the second clamping member 32. The use of a second fastener 54 that has an axis that extends in the direction 38 to move a third clamping member 40 in a perpendicular direction 44 is a unique arrangement.

Figure 10:
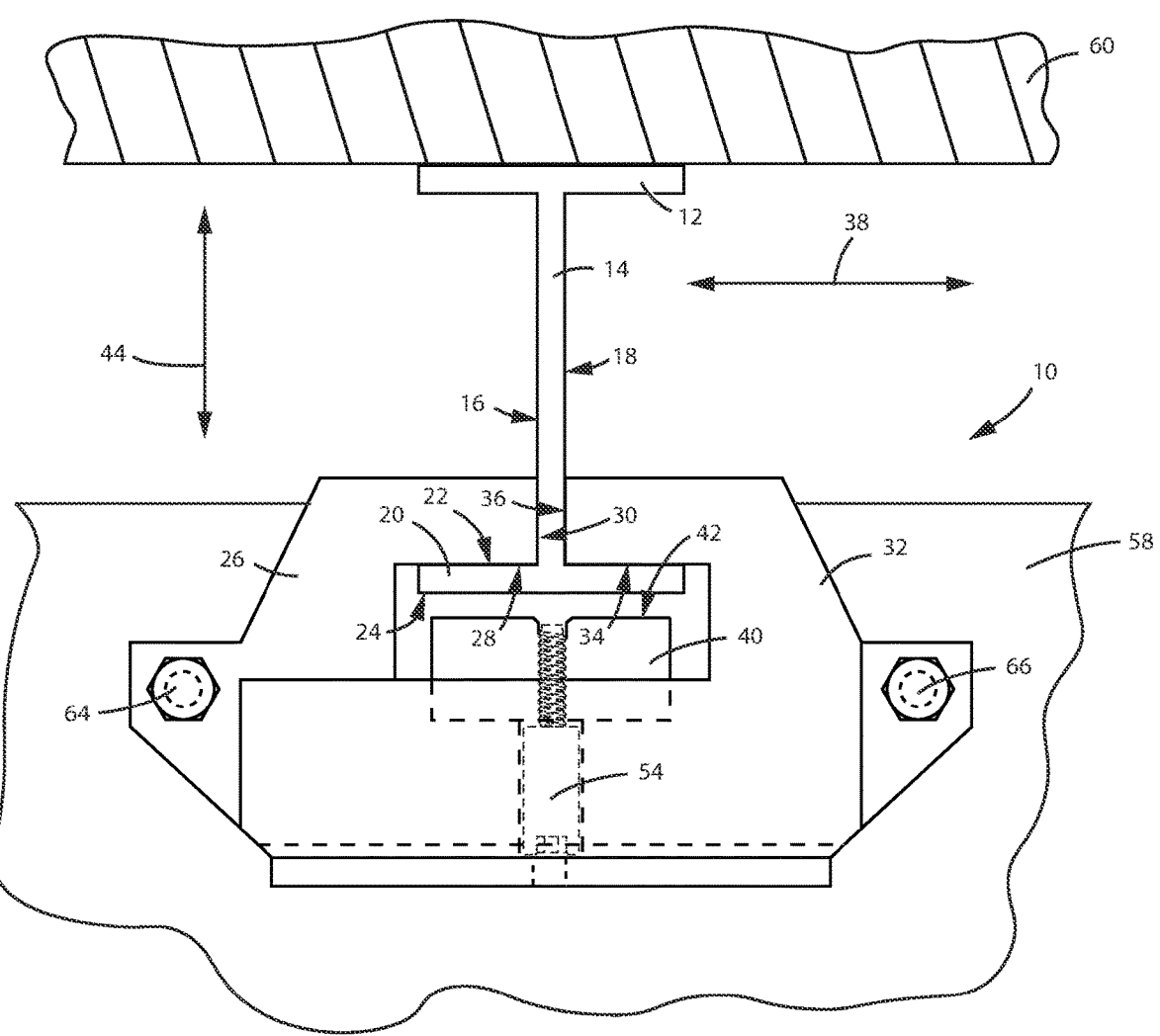
FIG. 10 is a side view of an I-beam clamp with a third clamping member that moves in a direction perpendicular to a face of the bottom flange of the I-beam.
Figure 11:
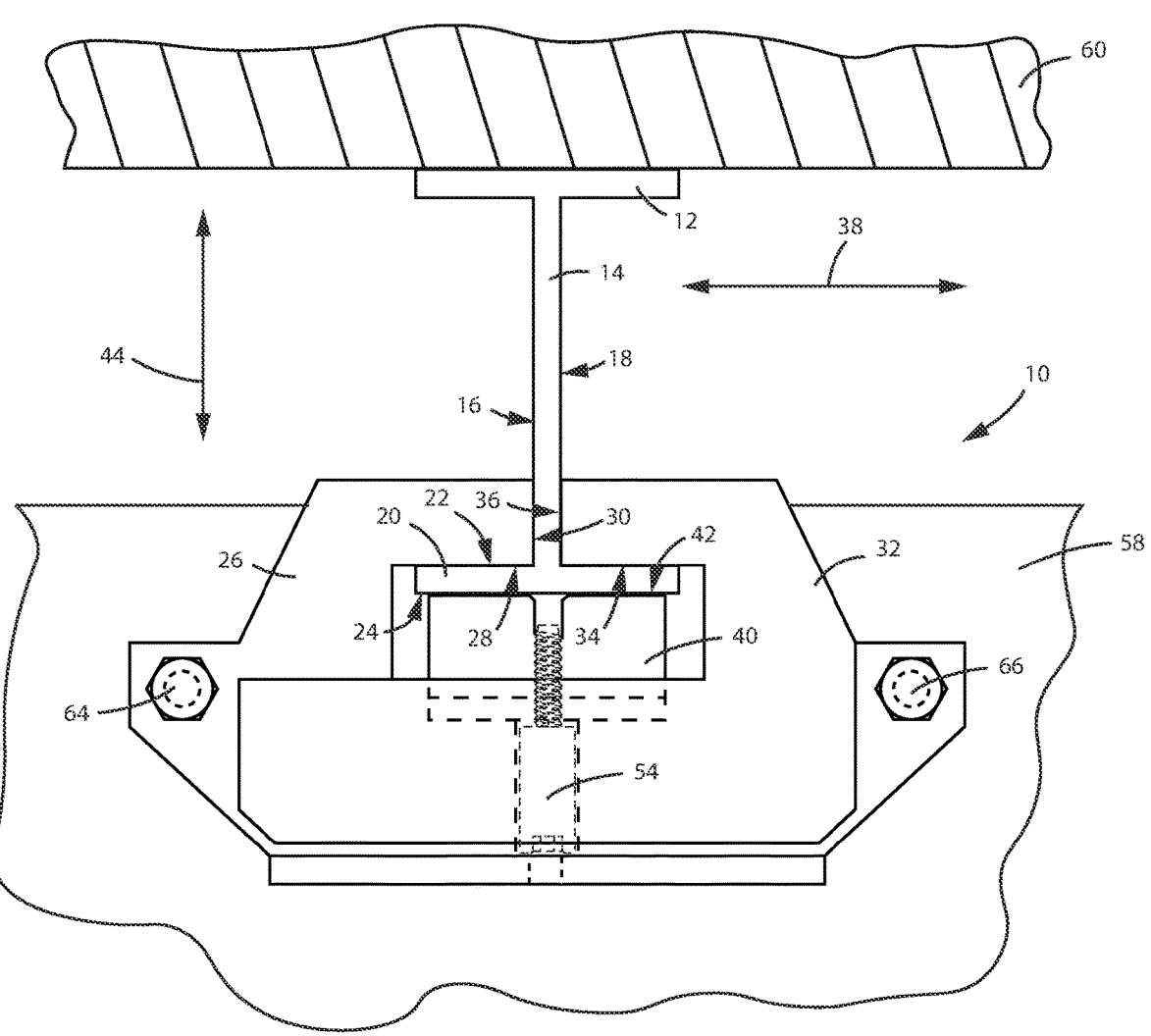
FIG. 11 is the I-beam clamp of FIG. 3 but with the third clamping member actuated to engage the bottom flange of the I-beam.

Instead of using the third clamping member 40 with a third clamping member inclined surface 46, the third clamping member 40 can be moved into and out of engagement with the second flange surface 24 without the use of an inclined surface. FIGS. 10 and 11 show an alternate embodiment without any inclination as previously described. The first fastener 50 is not shown for sake of clarity but may be present and used as previously described. The third clamping member 40 is located within the first and second clamping members 26 and 32 which can contain it and prevent it from falling out via slotted arrangements. The second fastener 54 is oriented in the vertical direction so that the axis of the second fastener 54 is parallel to direction 44 and perpendicular to direction 38. The second fastener 54 engages the second clamping member 32 and is in threaded engagement with the third clamping member 40. The position of the second fastener 54 relative to the second clamping member 32 does not change upon actuation of the second fastener 54. As shown in FIG. 10, the third clamping member 40 is completely spaced from and free from contact with the second flange surface 24. Actuation of the second fastener 54 results in the threaded engagement with the third clamping member 40 causing the third clamping member 40 to move relative to the second clamping member 32 in the direction 44. Continued tightening of the second fastener 54 causes the third flange engagement surface 42 to engage the second flange surface 24 and thus the third clamping member 40 engages the I-beam 12. The five point surface engagement between the I-beam 12 and the I-beam clamp 10 can be effected in this manner Reversing the first and second fasteners 50 and 54 causes the five engagement surfaces to disengage and allow the I-beam clamp 10 to be removed from the I-beam 12. The skirt 58 is attached to the first clamping member 26 via bolts at the mounting holes 64 and 66, and the skirt 58 is attached to the trailer 60 via the I-beam clamp 10. The skirt 58 could be attached to the second clamping member 32 in other embodiments, or to both the first and second clamping members 26, 32 in yet additional embodiments. The second fastener 54 can be reverse threaded to push the third clamping member 40 away from the head of the second fastener 54.

Figure 12:
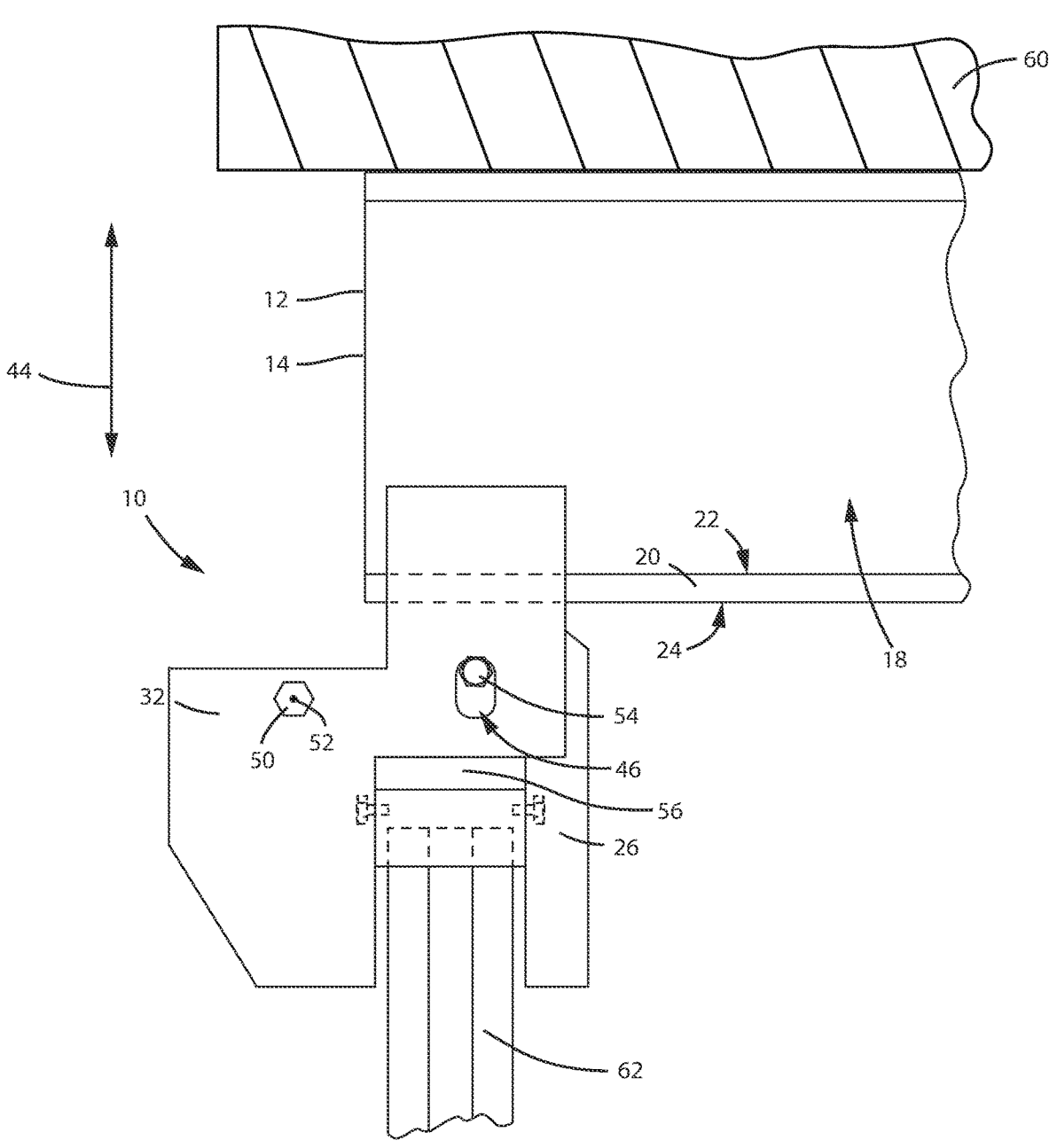
FIG. 12 is a front view of the I-beam clamp attached to an I-beam and attached to a support member.

FIG. 12 shows a front view of the I-beam clamp 10 attached to the I-beam 12 using components as previously discussed. The first fastener 50 is spaced from the second fastener 54 in the inboard/outboard direction of the trailer 60 so these components do not interfere with one another. The geometry of the first and second clamping members 26 and 32 is such that a space 56 is formed between the first and second clamping members 26 and 32, and within this space 56 the support member 62 is located and is bolted to both the first and second clamping members 26 and 32. This space 56 can be of any shape or size in various embodiments, and the space 56 need not be present in accordance with other exemplary embodiments. The skirt 58 is not shown attached to the I-beam clamp 10 but could be attached to the I-beam clamp 10 in other embodiments so that in these arrangements both the skirt 58 and the support member 62 are simultaneously attached to the I-beam clamp 10.

The I-beam clamp 10 clamps onto five areas of engagement as previously described and uses the web 14 to center the I-beam clamp 10. The I-beam clamp 10 can be made of material that reduces or eliminates corrosion and can be sized to accommodate I-beams 12 of any size. The I-beam clamp 10 can be made large enough to accommodate 3 inch long flanges 20 and close enough to provide clamping force to a web 14 that is ⅛ inch to ½ inch. As such, the I-beam clamp 10 can be used with variously sized I-beams 12. The configuration of having the five surface engagements as described maximizes surface contact and allows softer materials such as plastic to be incorporated into the I-beam clamp 10. The five surfaces 30, 36, 28, 34 and 42 that engage the I-beam 12 surfaces 16, 18, 22 and 24 can flat, or can be round to reduce surface area, or can be combinations thereof where some of these surfaces are flat and others are rounded.

The present I-beam clamp 10 has been shown and described as being used to attach aerodynamic components such as skirts 58 and support members 62 to a trailer 60. However, it is to be understood that these are only certain embodiments the application of the I-beam clamp 10 and that the I-beam clamp 10 can be used in more applications than just with a trailer 60. The presently disclosed I-beam clamp 10 can be used for attachment to any I-beam 12 and is not limited to use just with I-beams 12 of trailers 60 or even with vehicles for that matter.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An I-beam clamp, comprising:
a first clamping member having a first flange engagement surface configured for engagement with a first flange surface of a flange of an I-beam, wherein the first clamping member has a first web engagement surface configured for engagement with a first web surface of a web of the I-beam;
a second clamping member having a second flange engagement surface configured for engagement with the first flange surface, wherein the second clamping member has a second web engagement surface configured for engaging a second web surface of the web of the I-beam, wherein the first clamping member and the second clamping member are configured for movement relative to one another in a direction perpendicular to the first web surface and the second web surface;
a third clamping member having a third flange engagement surface configured for engagement with a second flange surface of the flange of the I-beam, wherein the third clamping member is configured for movement relative to the second clamping member toward the second flange surface;
a first fastener that engages the first clamping member and the second clamping member, wherein rotation of the first fastener is to effect movement of the first clamping member and the second clamping member relative to one another;
a second fastener that engages the third clamping member, wherein rotation of the second fastener is to effect movement of the third clamping member relative to the second clamping member,
wherein one of the first clamping member and the second clamping member defines a slot and the other of the first clamping member and the second clamping member includes a projection that engages the slot to slidably couple the first clamping member to the second clamping member.

2. The I-beam clamp as set forth in claim 1, wherein an axis of the first fastener is parallel to the direction perpendicular to the first web surface and the second web surface.

3. The I-beam clamp as set forth in claim 1, wherein the third clamping member has a third clamping member inclined surface that engages a second clamping member inclined surface of the second clamping member, wherein the third clamping member is configured for movement toward the second flange surface upon movement along the second clamping member inclined surface.

4. The I-beam clamp as set forth in claim 1, wherein the second fastener engages the second clamping member, wherein rotation of the second fastener is to effect movement of the third clamping member both in a direction perpendicular to the second flange surface and in the direction perpendicular to the first web surface and the second web surface.

5. The I-beam clamp as set forth in claim 1, wherein the rotation of the second fastener is to effect movement of the second fastener in the direction perpendicular to the first web surface and the second web surface.

6. The I-beam clamp as set forth in claim 1, wherein the second fastener engages the second clamping member, wherein the second fastener is constrained such that rotation of the second fastener does not cause movement of the second fastener relative to the second clamping member in the direction perpendicular to the first web surface and the second web surface, and wherein the second fastener is constrained such that rotation of the second fastener does not cause movement of the second fastener in a direction perpendicular to the second flange surface.

7. The I-beam clamp as set forth in claim 1, wherein a space is defined between the first clamping member and the second clamping member and is configured for receiving a portion of a cantilevered beam for a trailer skirt.

8. The I-beam clamp as set forth in claim 1, wherein rotation of the first fastener is to effect movement of the first clamping member and the second clamping member toward one another to engage the first web surface and the second web surface.

9. The I-beam clamp as set forth in claim 8, wherein rotation of the second fastener is to effect movement of the third clamping member toward the second clamping member and away from the first clamping member.

10. The I-beam clamp as set forth in claim 1, wherein rotation of the second fastener is to effect movement of the third clamping member relative to the second clamping member between a first position, in which the third flange engagement surface is spaced apart from the second flange surface, and a second position in which the third flange engagement surface engages the second flange surface, and wherein, while the first flange engagement surface and the second flange engagement surface engage the first flange surface, the first web engagement surface engages the first web surface, and the second web engagement surface engages the second web surface, the third clamping member is movable between the first position and the second position.

11. An I-beam clamp for attaching a trailer skirt to an I-beam, comprising:

a first clamping member having a first flange engagement surface configured for engagement with a first flange surface of a flange of the I-beam, wherein the first clamping member has a first web engagement surface configured for engagement with a first web surface of a web of the I-beam;

a second clamping member having a second flange engagement surface configured for engagement with the first flange surface, wherein the second clamping member has a second web engagement surface configured for engaging a second web surface of the web of the I-beam, wherein the first clamping member and the second clamping member are configured for movement relative to one another in a direction perpendicular to the first web surface and the second web surface;

a third clamping member having a third flange engagement surface configured for engagement with a second flange surface of the flange of the I-beam, wherein the third clamping member is configured for movement toward the second flange surface;

a first fastener that engages the first clamping member and the second clamping member, wherein rotation of the first fastener is to effect movement of the first clamping member and the second clamping member relative to one another;

a second fastener that engages the third clamping member, wherein rotation of the second fastener is to effect movement of the third clamping member relative to the second clamping member, wherein the first clamping member has mounting holes that are configured to face the trailer skirt;

wherein the mounting holes are to receive mounting bolts for attachment to the trailer skirt; and wherein one of the first clamping member and the second clamping member defines a slot and the other of the first clamping member and the second clamping member includes a projection that engages the slot to slidably couple the first clamping member to the second clamping member.

12. An I-beam clamp, comprising:

a first clamping member having a first flange engagement surface configured for engagement with a first flange surface of a flange of an I-beam, wherein the first clamping member has a first web engagement surface configured for engagement with a first web surface of a web of the I-beam;

a second clamping member having a second flange engagement surface configured for engagement with the first flange surface of the flange of the I-beam, wherein the second clamping member has a second web engagement surface configured for engaging a second web surface of the web of the I-beam, wherein the first clamping member and the second clamping member are configured for movement relative to one another in a direction perpendicular to the first and second web surfaces;

a third clamping member having a third flange engagement surface configured for engagement with a second flange surface of the flange of the I-beam, wherein the third clamping member is configured for movement relative to the second clamping member toward the second flange surface of the flange of the I-beam;

a first fastener that engages the first clamping member and the second clamping member, wherein rotation of the first fastener is to effect movement of the first clamping member and the second clamping member relative to one another; and a second fastener that engages the third clamping member, wherein rotation of the second fastener is to effect movement of the third clamping member relative to the second clamping member, wherein, while the first flange engagement surface and the second flange engagement surface engage the first flange surface, the first web engagement surface engages the first web surface, and the second web engagement surface engages the second web surface, the third clamping member is movable between a first position, in which the third flange engagement surface is spaced apart from the second flange surface, and a second position, in which the third flange engagement surface engages the second flange surface; and wherein one of the first clamping member and the second clamping member defines a slot and the other of the first clamping member and the second clamping member includes a projection that engages the slot to slidably couple the first clamping member to the second clamping member.

* * * * *